US011085310B2

(12) United States Patent
Niergarth et al.

(10) Patent No.: US 11,085,310 B2
(45) Date of Patent: Aug. 10, 2021

(54) VARIABLE PITCH FAN ACTUATOR

(71) Applicant: General Electric Company, Schenectady, NY (US)

(72) Inventors: Daniel Alan Niergarth, Cincinnati, OH (US); Darek Tomasz Zatorski, Fort Wright, KY (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 16/188,373

(22) Filed: Nov. 13, 2018

(65) Prior Publication Data

US 2020/0024981 A1   Jan. 23, 2020

Related U.S. Application Data

(62) Division of application No. 14/943,059, filed on Nov. 17, 2015, now Pat. No. 10,221,706.

(51) Int. Cl.
*F01D 7/00* (2006.01)
*B64C 11/32* (2006.01)
(Continued)

(52) U.S. Cl.
CPC ............... *F01D 7/00* (2013.01); *B64C 11/32* (2013.01); *B64C 11/325* (2013.01); *F01D 7/02* (2013.01);
(Continued)

(58) Field of Classification Search
CPC ....... B64C 11/32–44; F01D 7/00; F01D 7/02; F01D 17/12; F02C 9/58; F02K 1/66;
(Continued)

(56) References Cited

U.S. PATENT DOCUMENTS 3,873,236 A    3/1975 Gall
4,704,862 A *  11/1987 Dennison .................. F02C 7/36
                                                60/226.2
(Continued)

FOREIGN PATENT DOCUMENTS

EP    0 203 881 A1    12/1986
GB    1196588 A       7/1970
GB    2 155 114 A     9/1985

OTHER PUBLICATIONS

Extended European Search Report and Opinion issued in connection with corresponding EP Application No. 6198954.6 dated Mar. 31, 2017.

*Primary Examiner* — Scott J Walthour
(74) *Attorney, Agent, or Firm* — Dority & Manning, P.A.

(57) ABSTRACT

A gas turbine engine including a core having in serial flow order a compressor, a combustor, and a turbine—the compressor, combustor, and turbine together defining a core air flowpath. The gas turbine engine additionally includes a fan section mechanically coupled to the core, the fan section including a plurality of fan blades, and each of the plurality fan blades defining a pitch axis. An actuation device is operable with the plurality fan blades for rotating the plurality fan blades about their respective pitch axes, the actuation device including an actuator located outward of the core air flowpath to, e.g., simplify the gas turbine engine.

8 Claims, 5 Drawing Sheets

(51) Int. Cl.
| | |
|---|---|
| *F02C 7/32* | (2006.01) |
| *F01D 17/12* | (2006.01) |
| *F01D 7/02* | (2006.01) |
| *F02C 9/58* | (2006.01) |
| *F02C 3/10* | (2006.01) |
| *F02C 7/04* | (2006.01) |
| *F02K 3/06* | (2006.01) |

(52) U.S. Cl.
CPC ................ *F01D 17/12* (2013.01); *F02C 3/10* (2013.01); *F02C 7/04* (2013.01); *F02C 7/32* (2013.01); *F02C 9/58* (2013.01); *F02K 3/06* (2013.01); *F05B 2220/302* (2013.01); *F05B 2260/70* (2013.01); *F05B 2260/74* (2013.01); *F05D 2220/36* (2013.01); *F05D 2260/70* (2013.01); *F05D 2260/74* (2013.01); *F05D 2260/75* (2013.01); *F05D 2260/76* (2013.01); *Y02T 50/60* (2013.01)

(58) Field of Classification Search
CPC ............. F05D 2260/70; F05D 2260/74; F05D 2260/75; F05D 2260/76
See application file for complete search history.

(56) References Cited

U.S. PATENT DOCUMENTS

| | | |
|---|---|---|
| 4,738,591 A | 4/1988 | Butler |
| 4,934,901 A | 6/1990 | Duchesneau |
| 5,071,076 A | 12/1991 | Chagnon et al. |
| 7,296,969 B2 | 11/2007 | Raes et al. |
| 7,976,279 B2 | 7/2011 | Raes et al. |
| 8,133,027 B2 | 3/2012 | Carvalho et al. |
| 8,439,640 B2 | 5/2013 | Arel et al. |
| 8,753,084 B2 | 6/2014 | Morgan |

\* cited by examiner

VARIABLE PITCH FAN ACTUATOR

CROSS-REFERENCE TO RELATED APPLICATION

This application is a divisional of U.S. application Ser. No. 14/943,059, filed on Nov. 17, 2015, titled "VARIABLE PITCH FAN ACTUATOR", which is hereby expressly incorporated herein by reference in its entirety.

FIELD OF THE INVENTION

The present subject matter relates generally to an actuation device for a variable pitch fan.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. The compressor section, combustion section, and turbine section together define a core air flowpath therethrough. In particular configurations, the turbine section is mechanically coupled to the compressor section by one or more shafts extending along an axial direction of the gas turbine engine.

The fan includes a plurality of blades having a radius larger than the core of the gas turbine engine. The fan and plurality of blades may also be mechanically coupled to one of the one or more shafts such that they rotate along with the turbine. Rotation of the plurality of blades generates thrust for the gas turbine engine and provides airflow to the compressor section of the core.

For at least some gas turbine engines, the fan is a variable pitch fan. It can be desirable to vary a pitch of the fan blades by rotating the blades about respective pitch axes to further increase performance of the gas turbine engine. For example, a primary reason for changing blade pitch is to adjust the blade's angle of attack for optimal performance based on the present air speed of the aircraft and power level of the engine. Alternatively, the pitch of fan blades may be used to reverse the airflow, bypassing the core of the engine, thus providing reverse thrust to aerodynamically brake a landing aircraft.

An actuation member is typically provided in operable communication with the plurality of fan blades to change the pitch of the plurality of fan blades. More particularly, the actuation member includes an actuator packaged within the fan section, typically proximate the plurality of fan blades to rotate the plurality of fan blades about respective pitch axes. However, such a configuration may make it more difficult to repair and/or maintain such actuator. Further, such a configuration may increase the complexity of the engine by, e.g., requiring transfers of pressurized hydraulic fluid from a static frame of reference to a rotating frame of reference.

Accordingly, an actuation member having a more accessible actuator would be useful. Additionally, an actuation member having an actuator for rotating the plurality of fan blades that does not require transferring a pressurized hydraulic fluid from a static frame of reference to a rotating frame of reference would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a core having in serial flow order a compressor, a combustor, and a turbine. The compressor, combustor, and turbine together define a core air flowpath. The gas turbine engine also includes a fan section mechanically coupled to the core. The fan section includes a plurality of fan blades, each of the plurality of fan blades defining a pitch axis, and the plurality of fan blades each rotatable about their respective pitch axis. The gas turbine engine also includes an actuation device operable with the plurality of fan blades for rotating the plurality of fan blades about their respective pitch axes. The actuation device includes an actuator located outward of the core air flowpath.

In another exemplary embodiment of the present disclosure, an actuation device for a gas turbine engine is provided. The gas turbine engine including a core defining a core air flowpath and a fan section mechanically coupled to the core. The fan section includes a plurality of fan blades each rotatable about a pitch axis. The actuation device includes an actuator configured to be located outward of the core air flowpath of the core when the actuation device is installed in the gas turbine engine. The actuation device additionally includes a connection assembly extending from the actuator for operably connecting the actuator to the plurality of fan blades through the core air flowpath when the actuation device is installed in the gas turbine engine. The connection assembly includes a rotating to static transfer device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
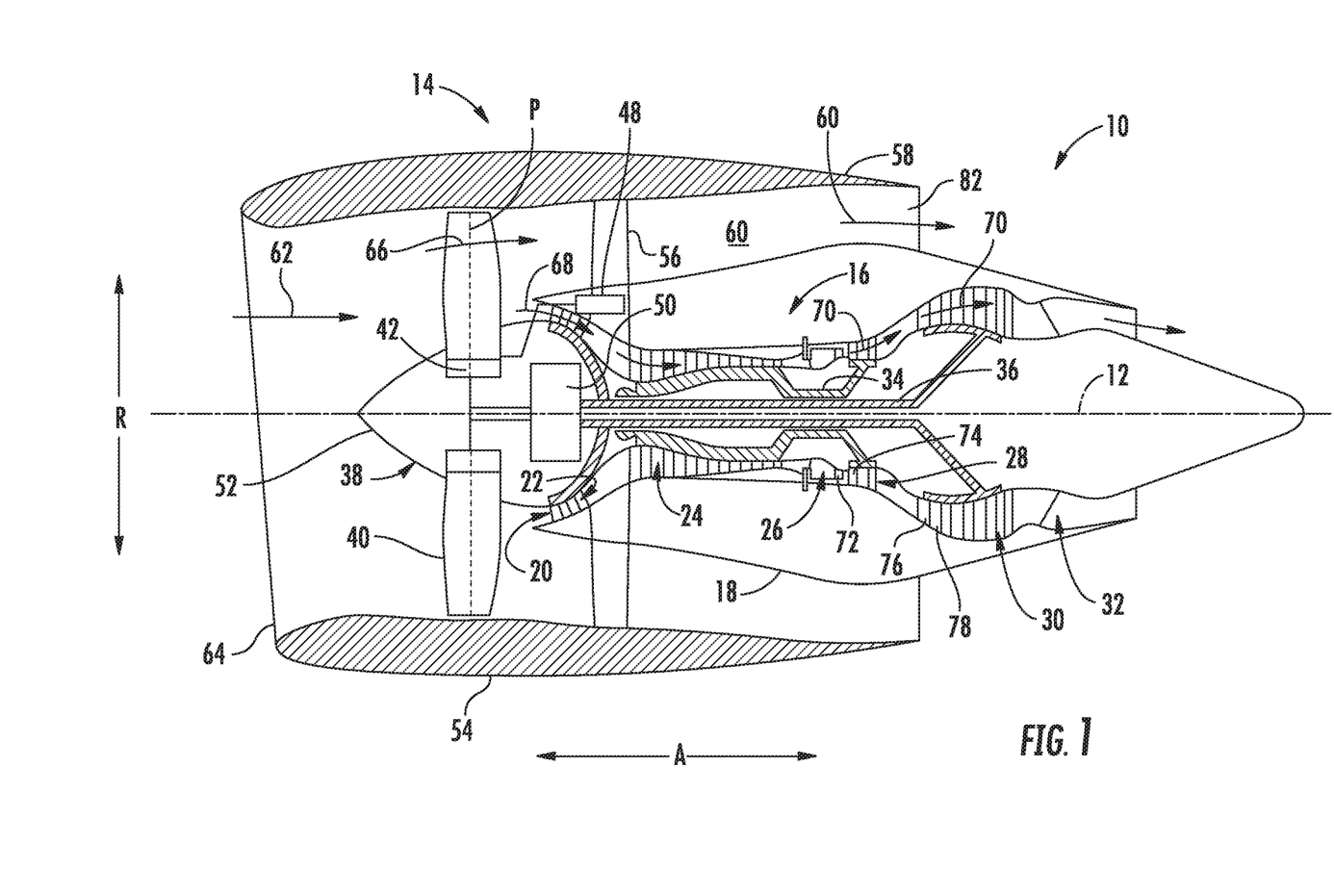
FIG. 1 is a schematic, cross-sectional view of a gas turbine engine according to an exemplary embodiment of the present disclosure.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 3). In general, the turbofan 10 includes a fan section 14 and a core turbine engine 16 disposed downstream from the fan section 14.

The exemplary core 16 of the turbofan engine 10 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Additionally, each fan blade 40 is rotatable relative to the disk 42 about a pitch axis P by virtue of the fan blades 40 being operatively coupled to a suitable actuation assembly 48—the actuation assembly 48 configured to vary a pitch of the fan blades 40 in a manner described in detail below. The fan blades 40 and disk 42 are together rotatable about the longitudinal axis 12 by the LP shaft 36 across a power gear box 50. The power gear box 50 includes a plurality of gears for stepping down the rotational speed of the LP shaft 36 to a more efficient rotational fan speed. Additionally, for the embodiment depicted, the disk 42 of the variable pitch fan 38 is covered by rotatable front hub 52 aerodynamically contoured to promote an airflow through the plurality of fan blades 40.

Referring still to the exemplary turbofan engine 10 of FIG. 1, the exemplary fan section 14 additionally includes an annular fan casing or outer nacelle 54 that circumferentially surrounds the fan 38 and/or at least a portion of the core turbine engine 16. It should be appreciated that the nacelle 54 may be configured to be supported relative to the core turbine engine 16 by a plurality of circumferentially-spaced outlet guide vanes 56. Moreover, a downstream section 58 of the nacelle 54 may extend over an outer portion of the core turbine engine 16 so as to define a bypass airflow passage 60 therebetween.

During operation of the turbofan engine 10, a volume of air 62 enters the turbofan 10 through an associated inlet 64 of the nacelle 54 and/or fan section 14. As the volume of air 62 passes across the fan blades 40, a first portion of the air as indicated by arrows 66 is directed or routed into the bypass airflow passage 60 and a second portion of the air as indicated by arrow 68 is directed or routed into the LP compressor 22. The ratio between the first portion of air 66 and the second portion of air 68 is commonly known as a bypass ratio. The pressure of the second portion of air 68 is then increased as it is routed through the high pressure (HP) compressor 24 and into the combustion section 26, where it is mixed with fuel and burned to provide combustion gases 70.

The combustion gases 70 are routed through the HP turbine 28 where a portion of thermal and/or kinetic energy from the combustion gases 70 is extracted via sequential stages of HP turbine stator vanes 72 that are coupled to the outer casing 18 and HP turbine rotor blades 74 that are coupled to the HP shaft or spool 34, thus causing the HP shaft or spool 34 to rotate, thereby supporting operation of the HP compressor 24. The combustion gases 70 are then routed through the LP turbine 30 where a second portion of thermal and kinetic energy is extracted from the combustion gases 70 via sequential stages of LP turbine stator vanes 76 that are coupled to the outer casing 18 and LP turbine rotor blades 78 that are coupled to the LP shaft or spool 36, thus causing the LP shaft or spool 36 to rotate, thereby supporting operation of the LP compressor 22 and/or rotation of the fan 38.

The combustion gases 70 are subsequently routed through a jet exhaust nozzle section 82 of the core turbine engine 16 to provide propulsive thrust. Simultaneously, the pressure of the first portion of air 66 is substantially increased as the first portion of air 66 is routed through the bypass airflow passage 60 before it is exhausted from a fan nozzle exhaust section 82 of the turbofan 10 also providing propulsive thrust.

It should be appreciated, however, that the exemplary turbofan engine 10 described above with reference FIG. 1 is provided by way of example only. In other exemplary embodiments, the exemplary turbofan engine 10 may have any other suitable configuration. For example, in other exemplary embodiments, the turbofan engine 10 may have any other suitable number of, e.g., spools or shafts, compressors, and/or turbines.

Figure 2:
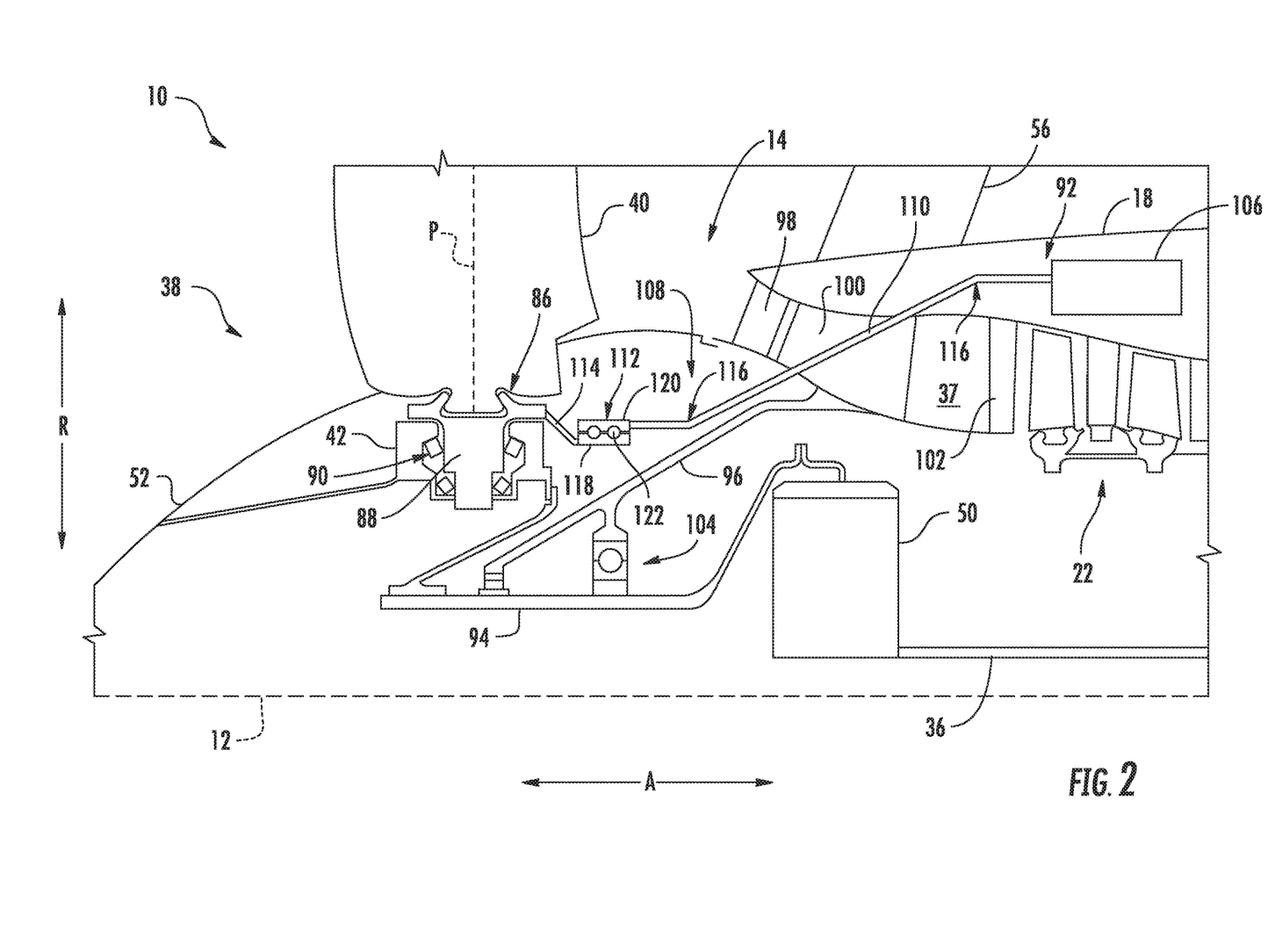
FIG. 2 is a schematic, cross-sectional view of a forward end of a gas turbine engine in accordance with an exemplary embodiment of the present disclosure.

Referring now to FIG. 2, a schematic, cross-sectional view of a forward end of a turbofan engine 10 in accordance with an exemplary embodiment of the present disclosure is provided. In certain exemplary embodiments, the exemplary turbofan engine 10 of FIG. 2 may be configured in substantially the same manner as exemplary turbofan engine 10 of FIG. 1. Accordingly, the same or similar numbering may refer to the same or similar part.

As depicted in FIG. 2, the turbofan engine 10 generally defines an axial direction A and a radial direction R. Moreover, the turbofan engine 10 defines a circumferential direction C (see FIG. 3) extending about the axial direction A.

The fan 38 section 14 generally includes a variable pitch fan 38 having a plurality of fan blades 40 coupled to a disk 42. More specifically, each fan blade 40 defines a base 86 at an inner end along the radial direction R. Each fan blade 40 is coupled at the base 86 to the disk 42 via a respective trunnion mechanism 88. The disk 42 includes a plurality of bearings 90 such that the trunnion mechanism 88 is rotatably mounted within the disk 42—the trunnion mechanism 88 thus facilitating rotation of a respective fan blade 40 about a pitch axis P of the respective fan blades 40. Furthermore, as will be discussed in greater detail below, the exemplary turbofan engine 10 depicted includes an actuation device 92 operable with the plurality of fan blades 40 for rotating the plurality of fan blades 40 about their respective pitch axes P.

For the embodiment depicted, the base 86 is configured as a dovetail received within a correspondingly shaped dovetail slot of the trunnion mechanism 88. However, in other exemplary embodiments, the base 86 may be any suitable fan blade attachment feature for attaching the blade 40 to the trunnion mechanism 88. For example, the base 40 may be attached to the trunnion mechanism 88 using a pinned connection, or any other suitable connection. In still other exemplary embodiments, the base 86 may be formed integrally with the trunnion mechanism 88.

Further, as with the exemplary turbofan engine 10 of FIG. 1, the fan 38 of the exemplary turbofan engine 10 depicted in FIG. 2 is mechanically coupled to the core 16. More particularly, the exemplary variable pitch fan 38 of the turbofan engine 10 of FIG. 2 is rotatable about a longitudinal axis 12 by an LP shaft 36 across a power gearbox 46 (see also the embodiment of FIG. 1). For the embodiment depicted, the disk 42 is attached to the power gearbox 46 through a fan rotor 94. The power gearbox 46 is, in turn, attached to the LP shaft 36, such that rotation of the LP shaft 36 correspondingly rotates the fan rotor 94, disk 42, and the plurality of fan blades 40. Notably, as is also depicted, the fan section 14 additionally includes a front hub 52 (which is rotatable with, e.g., the disk 42 and plurality of fan blades 40).

Moreover, the fan 38 includes a static or stationary fan frame 96. The fan frame 96 is connected through the core air flowpath 37 to the core 16, or more particularly to an outer casing 18 of the core 16. For the embodiment depicted, the core 16 includes a forward strut, or vane, 98 and a main strut 100, each providing structural support between the outer casing 18 of the core 16 and the fan frame 96. Additionally, the LP compressor 22 includes an inlet guide vane 102. The forward vane 98, main strut 100, and inlet guide vane 102 may additionally be configured to condition and direct the portion of the flow of air over the fan 38 provided to the core air flowpath 37 to, e.g., increase an efficiency of the compressor section.

Furthermore, the fan 38 includes one or more fan bearings 104 for supporting rotation of the various rotating components of the fan 38, such as the plurality of fan blades 40. More particularly, the fan frame 96 supports the various rotating components of the fan 38 through the one or more fan bearings 104. For the embodiment depicted, the one or more fan bearings 104 include a ball bearing and a roller bearing. However, in other exemplary embodiments, any other suitable number and/or type of bearings may be provided for supporting rotation of the plurality of fan blades 40. For example, in other exemplary embodiments, the one or more fan bearings 104 may include a pair (two) tapered roller bearings, or any other suitable bearings. Additionally, in certain exemplary embodiments, the one or more fan bearings 104 may be formed of any suitable material. For example, in at least certain exemplary embodiments, the one or more fan bearings 104 may be formed of a suitable metal material, such as a stainless steel. Alternatively, however, in other exemplary embodiments the one or more fan bearings 104 may include one or more components formed of a suitable ceramic material.

Referring still to FIG. 2, as briefly discussed above, the turbofan engine 10 includes the actuation device 92 operable with the plurality of fan blades 40 for rotating the plurality of fan blades 40 about their respective pitch axes P. In certain exemplary embodiments, the actuation device 92 may be configured in a similar manner as the exemplary actuation assembly 48 of the embodiment of FIG. 1. As is depicted, the actuation device 92 includes an actuator 106 located outward of the core air flowpath 37 of the turbofan engine 10. More specifically, for the embodiment depicted, the actuator 106 is positioned outward of the core air flowpath 37 along the radial direction R, and further is positioned outward of an LP compressor 22 of the compressor section of the core 16 along the radial direction R. Additionally, for the embodiment depicted the actuator 106 of the actuation device 92 is enclosed within a core cowl, i.e., outer casing 18, of the core 16 of the turbofan engine 10. However, in other exemplary embodiments, the actuator 106 may be positioned in any other suitable location outward of the core air flowpath 37.

Moreover, the exemplary actuation device 92 depicted further includes a connection assembly 108 extending from the actuator 106 for operably connecting the actuator 106 to the plurality fan blades 40 through the core air flowpath 37. The exemplary connection assembly 108 generally includes a non-rotating mechanical coupling 110, a rotating to static transfer device 112, and a rotating mechanical coupling 114. The exemplary non-rotating mechanical coupling 110 extends between the rotating to static transfer device 112 and the actuator 106, through the core air flowpath 37, or more particularly, through the main strut 100 of the core 16. Further, for the embodiment depicted, the non-rotating mechanical coupling 110 is formed of one or more connection rods. As used herein, the term "rods" refers to any substantially inflexible mechanical component. Accordingly, the connection rods may be any suitable rod, shaft, beam, etc. Further, the one or more connection rods may be formed of any suitable material, such as a suitable metal material capable of withstanding an anticipated load thereon.

Moreover, for the embodiment depicted, the one or more connection rods include a plurality of connection rods. The plurality of connection rods depicted are formed integrally at various joints 116, e.g., by welding. However, in other exemplary embodiments, the plurality of connection rods may be rotatably or pivotably joined at the joints 116 to allow for some angular movement between the attached connection rods during operation of the actuator 106. Additionally, in still other exemplary embodiments, the one or more connection rods may be a single connection rod bent or otherwise machined to the desired shape.

Furthermore, for the embodiment depicted, the rotating to static transfer device 112 is positioned in the fan section 14 of the turbofan engine 10, inward of the core air flowpath 37. The rotating to static transfer device 112 is formed generally of an inner race 118, an outer race 120, and a plurality of bearings 122 located between the inner race 118 and the outer race 120. The plurality of bearings 122 facilitate a relative movement between the inner race 118 and the outer race 120. Specifically, for the embodiment depicted, inner race 118 is a rotatable inner race configured to rotate with, e.g., the disk 42 and plurality of fan blades 40, and the outer race 120 is a static outer race configured to remain stationary relative to, e.g., the disk 42 and plurality of fan blades 40. Accordingly, for the embodiment depicted, the non-rotating mechanical coupling 110 is attached to the static outer race 120, and the rotating mechanical coupling 114 is attached to the rotating inner race 118. However, in other exemplary embodiments, the outer race 120 may instead be a rotatable outer race and the inner race 118 may be a static inner race. In such an exemplary embodiment, the non-rotating mechanical coupling 110 may be attached to the static inner race and the rotatable mechanical couplings may be attached to the rotatable outer race.

Figure 3:
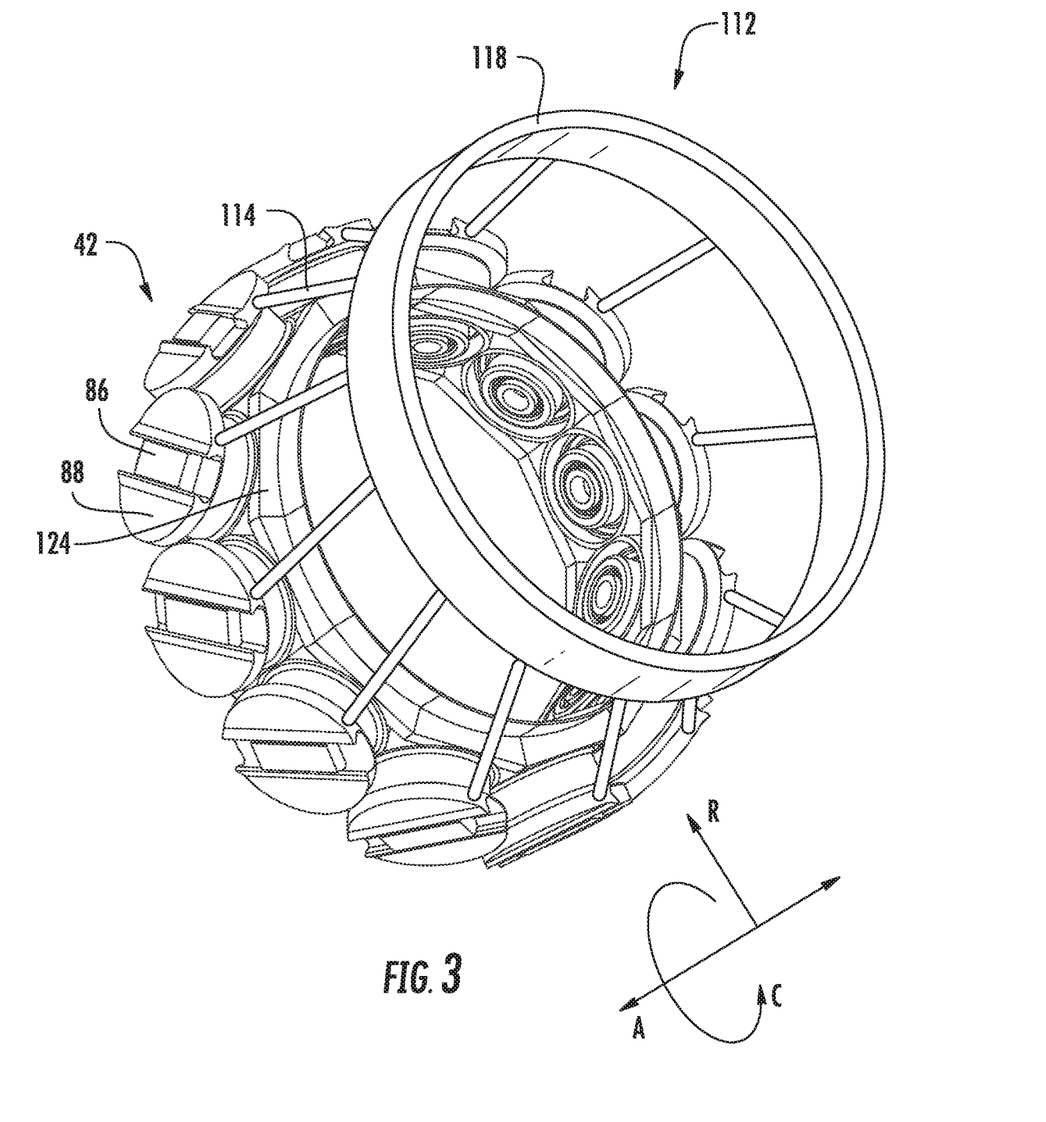
FIG. 3 is a perspective view of a portion of an exemplary actuation device in accordance with an exemplary aspect of the present disclosure.
Figure 4:
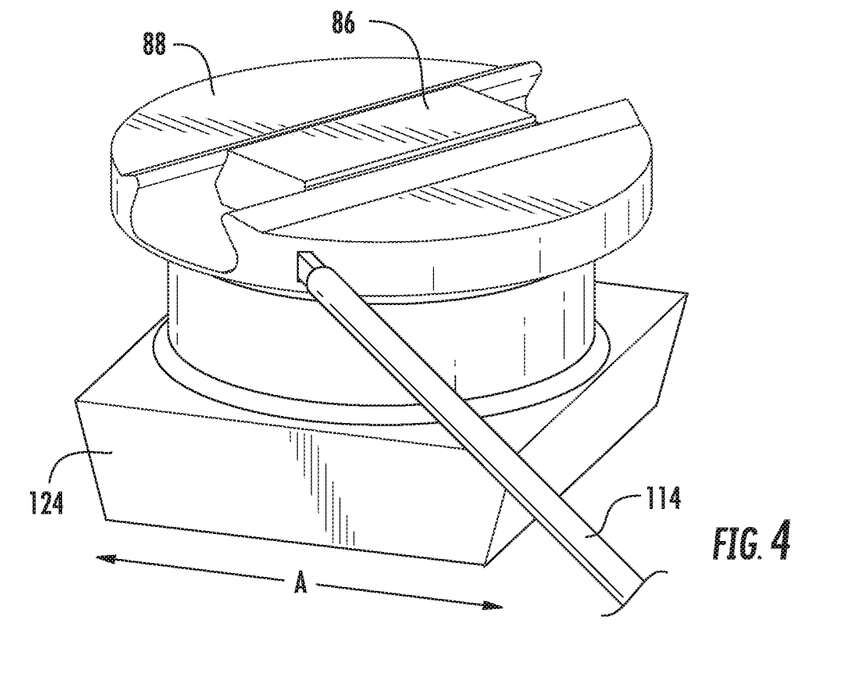
FIG. 4 is a first view of a disk segment in accordance with an exemplary embodiment of the present disclosure and a portion of the exemplary actuation device of FIG. 3.

Referring now also FIGS. 3 through 5, the actuation device 92, and particularly the rotating mechanical coupling 114, will be described in greater detail. FIG. 3 provides a perspective view of the inner race 118 of the rotating to static transfer device 112 along with the plurality of rotating mechanical couplings 114 extending to the disk 42 of the exemplary turbofan engine 10; FIG. 4 provides a first view of an exemplary disk segment 124 (of the disk 42) and trunnion mechanism 88 with a fan blade 40 at a first pitch angle; and FIG. 5 provides a second view of the exemplary disk segment 124 (of the disk 42) and trunnion mechanism 88 with the fan blade 40 at a second pitch angle.

As is depicted, the actuation device 92 is attached to the plurality of trunnion mechanisms 88 for rotating the plurality of fan blades 40 about their respective pitch axes P. More specifically, the exemplary actuation device 92 depicted includes a plurality of rotating mechanical couplings 114, which for the embodiment depicted are each also configured as a substantially inflexible rod, extending between the rotating to static transfer device 112 and at least one of the plurality of trunnion mechanisms 88. In certain exemplary embodiments, the plurality of rotating mechanical couplings 114 may each extend between the rotating to static transfer device 112 and a respective one of the plurality of trunnion mechanisms 88. More particularly, as is shown most clearly in FIG. 3, for the embodiment depicted, the exemplary actuation device 92 includes an individual rotating mechanical coupling 114 extending from the rotating inner race 118 of the rotating to static transfer device 112 to each of the plurality of trunnion mechanisms 88, such that each of the plurality of trunnion mechanisms 88 is attached to the rotating to static transfer device 112 by a dedicated rotating mechanical coupling 114.

Additionally, during operation of the actuation device 92, the actuator 106 moves the entire connection assembly 108 linearly along the axial direction A. Accordingly, for the embodiment depicted, the actuator 106 of the actuation device 92 is configured as a linear actuator. More specifically, the actuator 106 may move the non-rotating mechanical coupling 110 in a forward direction or in an aft direction along the axial direction A. For example, the actuator 106 may be configured as a hydraulic or electrical actuator attached to the non-rotating mechanical coupling 110 for moving the non-rotating mechanical coupling 110 along the axial direction A. The rotating to static transfer device 112 transfers such linear movement of the non-rotating mechanical coupling 110 to the rotating mechanical couplings 114. Notably, the rotating mechanical couplings 114 and rotating inner race 118 of the rotating to static transfer device 112 are all rotatable with the plurality of fan blades 40, disk 42, and fan rotor 94.

Figure 5:
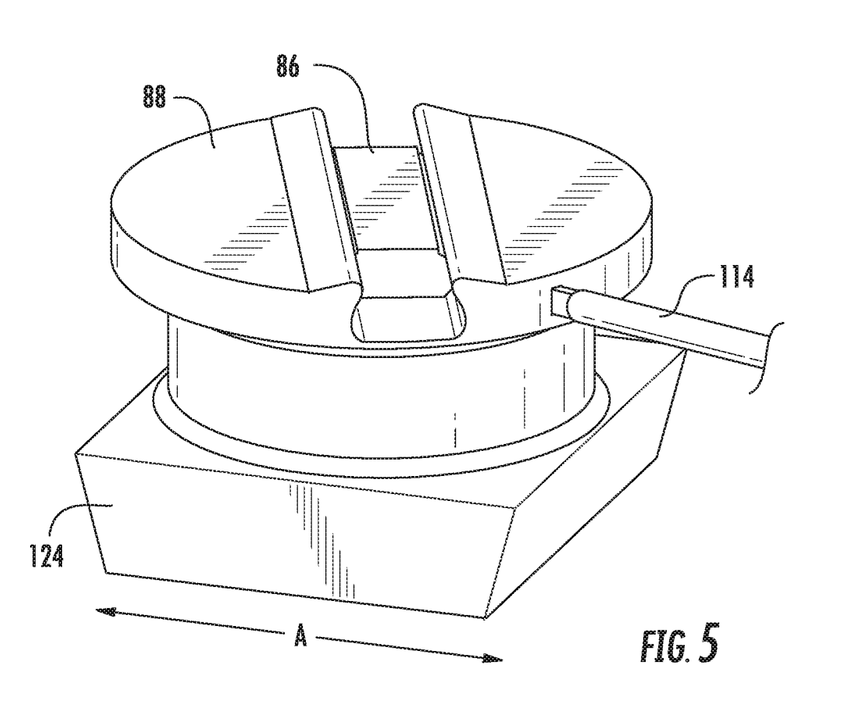
FIG. 5 is a second view of the exemplary disk segment of FIG. 4 and a portion of the exemplary actuation device of FIG. 3.

Referring still to FIGS. 3 through 5, the linear movement of the rotating mechanical couplings 114 along the axial direction A rotates the trunnion mechanisms 88, each of which in turn rotates a respective fan blade 40 attached thereto. Such operation is depicted in FIGS. 4 and 5. As shown, movement of the connection assembly 108 from a forward position (FIG. 4) aftwardly to an aft position (FIG. 5) rotates the trunnion mechanisms 88 through the disk 42, or more particularly, through each of the respective disk segments 124, correspondingly rotating the respective fan blades 40 about their pitch axes P.

Figure 6:
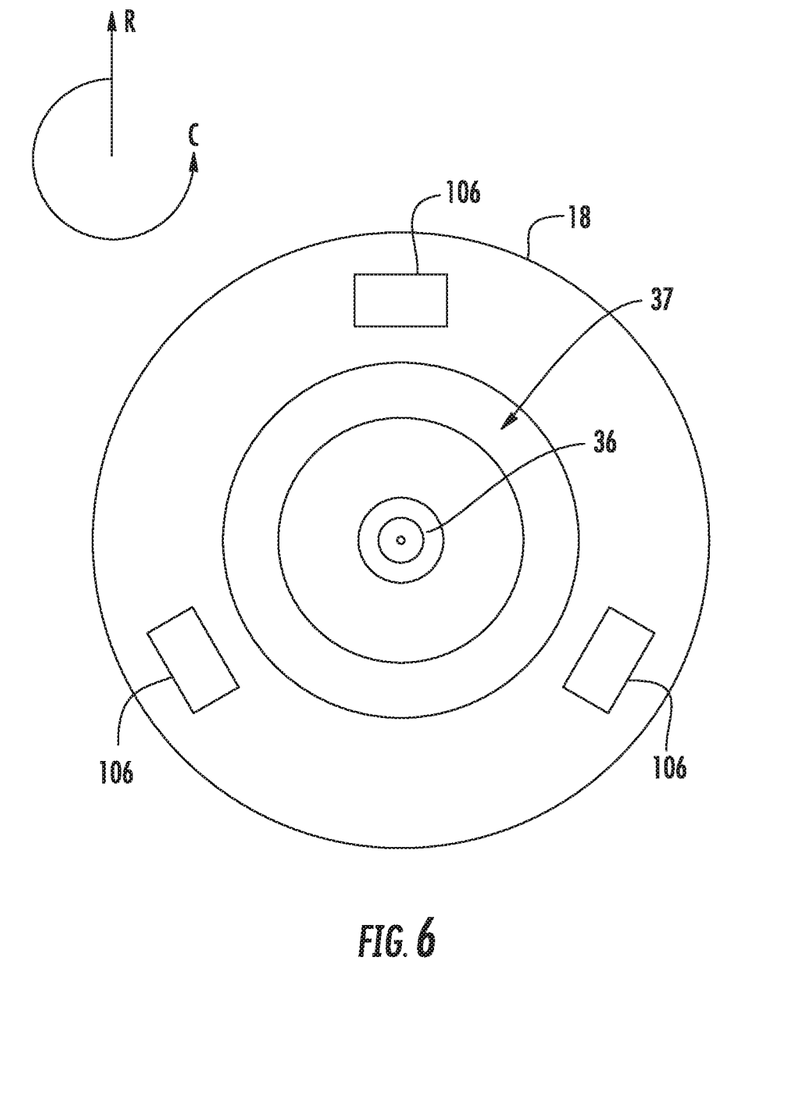
FIG. 6 is a cross-sectional view of a portion of a gas turbine engine in accordance with an exemplary embodiment of the present disclosure, taken in a plane perpendicular to an axial direction.

Referring now briefly to FIG. 6, providing a schematic, cross-sectional view of the turbofan engine 10 of FIG. 2 in a plane perpendicular to the axial direction A, it should be appreciated that in certain exemplary embodiments, the actuation device 92 may include a plurality of actuators 106 spaced along the circumferential direction C—the plurality of actuation devices 92 positioned above or radially outward of the core air flowpath 37, and/or in the core cowl compartment (not labeled). For example, in the embodiment of FIG. 6, the turbofan engine 10 may include three actuators 106 spaced evenly along the circumferential direction C (e.g., approximately 120 degrees apart).

However, in other exemplary embodiments, the actuation device 92 may include any other suitable number of actuators 106 spaced in any other suitable manner. For example, in other exemplary embodiments, the actuation device 92 may include a single actuator 106, two actuators 106, four actuators 106, six actuators 106, or any other suitable number of actuators 106. Further, in certain exemplary embodiments, the plurality of actuators 106 may move as a single unit to change a pitch of each of the plurality of fan blades 40 in unison. Alternatively, however, in other exemplary embodiments, the individual actuators 106 may instead move relative to one another (e.g., at different rates and/or amounts) to change a pitch of the plurality of fan blades in a non-uniform manner, such as in a cycloidal fashion. Such a configuration may allow for utilizing the fan blades 40 in 1 P mitigation.

It should also be appreciated that in still other exemplary embodiments, the actuation device 92 and/or turbofan engine 10 may be configured in any other suitable manner. For example, in other exemplary embodiments, any other suitable rotating to static transfer mechanism may be provided for the exemplary actuation device 92. For example, although the exemplary rotating to static transfer mechanism includes two rows of ball bearings, in other exemplary embodiments, a single row of bearings may be provided, or any other suitable number of rows and/or types of bearings may be provided. Additionally, although the exemplary actuator 106 is depicted as a linear actuator movable generally along the axial direction A, in other exemplary embodiments, the actuator 106 may instead be configured to move linearly at an angle relative to the axial direction A, or alternatively may be configured as a rotary actuator, or any other suitable type of actuator. Moreover, although not depicted, in other exemplary embodiments, the actuation device 92 may include one or more mounting features, pivotably or slidably mounting certain components of the connection assembly 108 within the fan 38 section of the turbofan engine 10, within the strut (e.g., strut 100), and/or within the outer casing 18 of the core 16. Further, it should be appreciated, that the exemplary turbofan engine 10 depicted is provided by way of example only. For example, in other exemplary embodiments, the exemplary turbofan engine 10 may, e.g., include any suitable structural configuration within the exemplary fan 38 section depicted.

A gas turbine engine including an actuation device according to one or more of the exemplary aspects depicted may allow for the actuator of such actuation device to be more easily accessible, such that the actuator of such actuation device may be more easily maintained and/or repaired if needed (as compared to being located inward of the core air flowpath). Further, positioning of the actuator of the actuation device outward of a core air flowpath of the gas turbine engine may simplify a fan section of the gas turbine engine, as less or no hydraulic lines may be required to extend therein, and thus an amount of pressurized hydraulic fluid being transferred from a static frame of reference to a rotating frame of reference may be reduced and/or eliminated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. It will be appreciated, that when the definite article "said" is used in the claims prior to an element, such use is to differentiate claimed elements from environmental elements identified by the definite article "the" and not included within the claimed subject matter. Additionally, for claims not including the definite article "said", the definite article "the" is used to identify claimed elements.

What is claimed is:

1. An actuation device for a gas turbine engine, the gas turbine engine comprising a core and a fan section mechanically coupled to the core, the core defining a core air flowpath, the fan section comprising a plurality of fan blades each rotatable about a pitch axis, the actuation device defining a central axis and comprising:
    an actuator configured for installation in the gas turbine engine and for rotating the plurality of fan blades; and
    a connection assembly coupled to the actuator and configured for operably connecting the actuator to the plurality of fan blades, the connection assembly comprising a multi-jointed coupling and a rotating to static transfer device, the multi-jointed coupling comprising multiple non-linear joints and extending between the actuator and the rotating to static transfer device to provide a non-linear connection between the actuator and the rotating to static transfer device, wherein a first non-linear joint of the multiple non-linear joints is positioned closer in proximity to the actuator than any other non-linear joint of the multiple non-linear joints, a second non-linear joint of the multiple non-linear joints is positioned closer in proximity to the rotating to static transfer device than any other non-linear joint of the multiple non-linear joints, and the first non-linear joint is positioned farther from the central axis, in a radial direction perpendicular to the central axis, than the second non-linear joint.

2. The actuation device of claim 1, wherein said rotating to static transfer device of said connection assembly is configured to be positioned in the fan section of the gas turbine engine when said actuation device is installed within the gas turbine engine.

3. The actuation device of claim 1, wherein said rotating to static transfer device comprises an inner race, an outer race, and a plurality of bearings located between said inner race and said outer race.

4. The actuation device of claim 1, wherein the multi-jointed coupling-comprises a non-rotating mechanical coupling extending between said rotating to static transfer device and said actuator.

5. The actuation device of claim 4, wherein said non-rotating mechanical coupling comprises a plurality of connection rods.

6. The actuation device of claim 4, wherein the actuator is a linear actuator.

7. The actuation device of claim 1, wherein said connection assembly further comprises a rotating mechanical coupling extending from said rotating to static transfer device, wherein said rotating mechanical coupling is configured to rotate at least one of the plurality of fan blades about the respective pitch axis of the at least one of the plurality of fan blades.

8. The actuation device of claim 1, wherein the core further comprises a strut extending through the core air flowpath, and wherein the connection assembly is configured to extend through the strut.

* * * * *